US005853130A

United States Patent [19]
Ellsworth

[11] Patent Number: 5,853,130
[45] Date of Patent: Dec. 29, 1998

[54] PROXIMITY SENSING SHOWER SYSTEM

[76] Inventor: Robert S. Ellsworth, 11320 Random Hills Rd., Suite 105, Fairfax, Va. 22030

[21] Appl. No.: 680,800

[22] Filed: Jul. 16, 1996

Related U.S. Application Data

[60] Provisional application No. 60/001,462 Jul. 17, 1995.

[51] Int. Cl. 6 .............................. A01G 27/00; B05B 1/14

[52] U.S. Cl. .............................. 239/548; 239/69; 239/73; 239/74; 239/99; 239/436; 239/444; 239/556; 239/563; 4/601

[58] Field of Search .............................. 239/67, 69, 71, 239/73, 74, 99, 436, 443, 444, 445, 548, 556, 557, 558, 562, 563; 4/597, 601

[56] References Cited

U.S. PATENT DOCUMENTS 1,200,972 10/1916 Passmann .............................. 239/444
2,261,500 11/1941 Lewis et al. .............................. 239/557
2,626,524 1/1953 Harman .............................. 239/71 X
4,756,030 7/1988 Juliver .............................. 4/192
4,838,310 6/1989 Scott et al. .............................. 239/69 X
4,998,673 3/1991 Pilolla .............................. 239/67

*Primary Examiner*—Andres Kashnikow
*Assistant Examiner*—Robin O. Evans
*Attorney, Agent, or Firm*—Scott J. Anchell

[57] ABSTRACT

The present disclosure concerns a fluid dispersion system such as for use in a personal shower. Groups of nozzles on a single showerhead are separately activated and regulated by corresponding valves. Each valve is controlled from a remote panel to provide an appropriate flow of water. A position detection system determines the relative position of a body with respect to the showerhead. The remote panel receives data from the position detection system and adjusts the valves to ensure the user remains in a desired flow of water.

19 Claims, 7 Drawing Sheets

PROXIMITY SENSING SHOWER SYSTEM

RIGHT OF PRIORITY

The present application claims priority under 35 USC §120(e) based on U.S. Provisional Application 60/001,462, filed 17 Jul. 1995.

BACKGROUND OF THE INVENTION a) Field of the Invention

The invention concerns a system for automatically regulating the volume and dispersion from a fluid flow outlet. In particular, the invention concerns a showerhead comprising specific features for regulating and adjusting the out-flow of water.

b) Description of Related Art

Conventional shower heads emit a spray of water toward the user based on the volume of water provided to the showerhead and the orientation of the showerhead. That is to say, the showerhead distributes whatever water is provided thereto in the direction the showerhead is pointing.

Traditionally, a showerhead is pivotally mounted on a pipe projecting from a shower enclosure wall. In order to redirect the flow of water to accommodate users of varying heights and preferences for proximity with respect to the showerhead, it is necessary to physically grab conventional showerheads and manually realign the direction of water flow. It is common to use a ball and socket joint to facilitate relative pivoting between the water supply pipe and conventional showerheads. Over time, such ball and socket joints tend to loosen (i.e. become unable to maintain the desired relative pivot angle), freeze (i.e. become stuck thereby preventing adjustment of the relative pivot angle), or leak. Additionally, those of diminutive physical stature, such as children or the disabled, are unable to manipulate conventional showerheads which are generally mounted at least six feet above the floor.

A conventional mixing valve arrangement is generally used to combine supplies of hot and cold water in a proportion which is satisfactory to the user. Such mixing valves are generally located on a shower enclosure wall beneath the showerhead. When fluctuations in the supplies of hot and cold water occur, conventional mixing valves are unable to compensate for the changes in pressure and/or temperature of the out-flow water. As a result, bursts of excessively hot or cold water may irritate or injure the user. Also, it is often the case that the user is unable to readjust the mixing valve without further exposure to the uncomfortable water.

SUMMARY OF THE INVENTION

According to one embodiment of the present invention, a motorized, flow adjustable showerhead, in combination with a programmable control system and/or a position detection system, would be installed in place of a conventional showerhead.

The microprocessor based control system would infinitely vary the amount of water flowing through one or more nozzles of the showerhead, from fully restricted to unrestricted fluid flow.

Alternatively, the control system could be programmed to limit the minimum flow rate so as to avoid the build-up of scalding water. A temperature monitor may be included in or with the control system to maintain the out-flow fluid at a selected temperature by adjusting fluid flow to compensate for variations in the fluid supply.

The control system may be combined with a position detection system (PDS) to automatically establish an appropriate water flow based on the location of the user with respect to a reference frame. The reference frame, maximum and minimum amounts of fluid flow, and sensitivity of the PDS may be programmed into the control system by the user. A manual override feature may also be included in the control system.

Communication between the showerhead and control system may be wireless (e.g. via infrared, digital infrared, radio frequency, etc.) or via wires. The PDS may use radar, sonar or an equivalent advanced technology to differentiate between fluid streams and a user, as well as work in a DC environment.

An objective of the present invention is to provide an automated adjustable and regulatable fluid flow outlet.

Another object of the present invention is to overcome the aforementioned disadvantages of conventional showerheads and provide an adjustable showerhead which is automatically responsive to the proximity of a user with respect to the showerhead.

A further object of the present invention is to regulate the flow of a fluid from an outlet having a plurality of nozzles. The fluid flow from each nozzle, or different groups of the nozzles can be independently regulated.

Yet another object of the present invention is to provide a programmable fluid flow control system which readily facilitates a plurality of customized settings for different users.

These and other objects of the present invention will become apparent in view of the following disclosure.

DESCRIPTION OF THE PREFERRED EMBODIMENT

Figure 1:
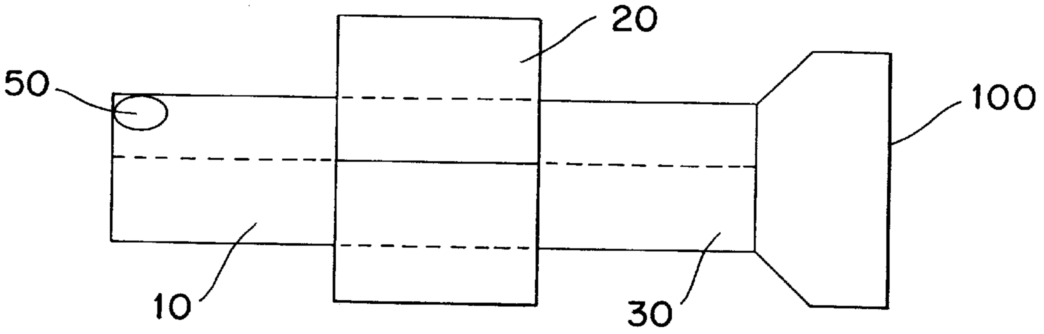
FIG. 1 illustrates an arrangement of the basic components for a showerhead according to the present invention.

FIG. 1 illustrates how the basic components of a showerhead according to the present invention are arranged with respect to conventional plumbing. It is common for conventional showerheads to be mounted at the end of a supply segment of pipe 10. According to the present invention, a valve unit 20 is connected at the end of pipe 10. The valve unit 20 splits fluid supplied from the pipe 10 into a plurality of separate flows which are individually controlled. The separated fluid flows are transferred from the valve unit 20, through a main tube 30, to a showerhead 100. Although it is not shown, the main tube 30 may also comprise a flexible portion leading to a hand-held showerhead.

Figure 2:
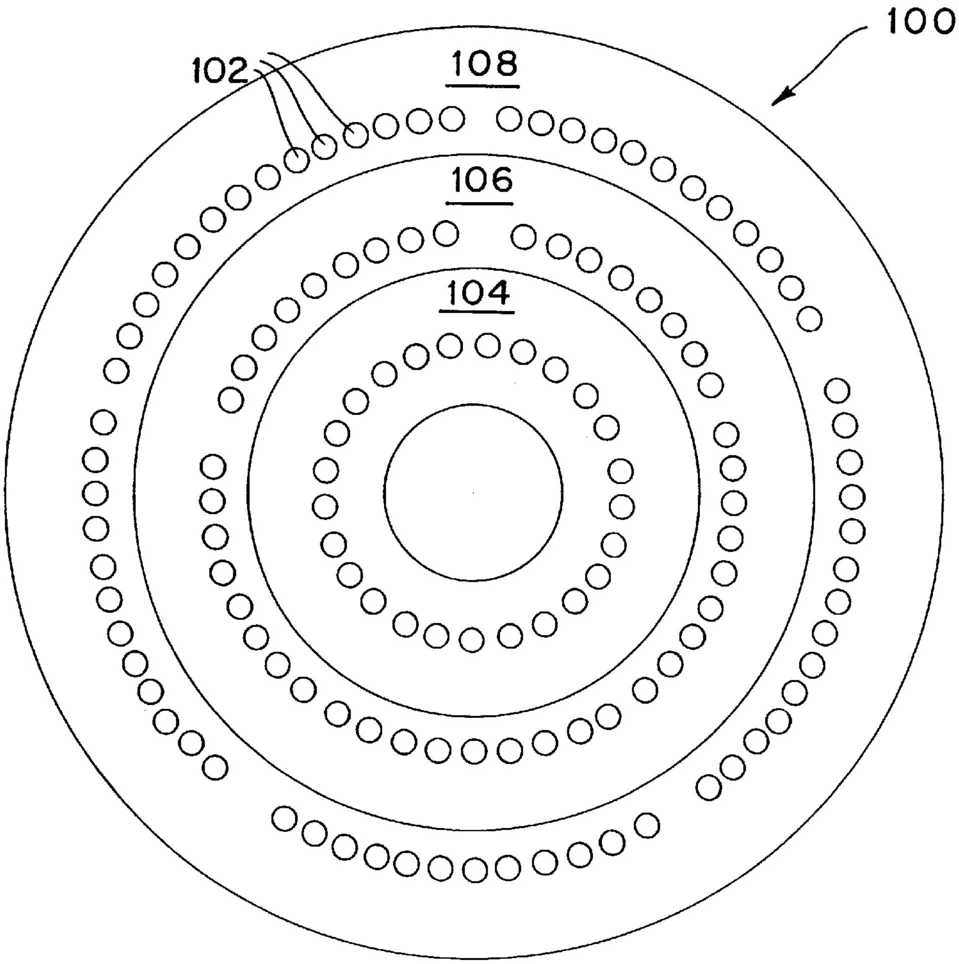
FIG. 2 illustrates a nozzle layout pattern for a showerhead according to the present invention.

FIG. 2 illustrates a possible layout pattern for fluid emitting nozzles 102 on the showerhead 100. Different sets of nozzles 102 may be grouped in three concentric rings 104,106,108 as shown in FIG. 2. The shape(s) of each set, the number of sets, and the number of nozzles per set may vary. Generally, the number of sets corresponds to the number of separated fluid flows through main tube 30 (i.e. one separated flow is in fluid communication with one set of nozzles). Each set of nozzles emits a different dispersion pattern such that one or more patterns are selected and adjusted to emit the desired volume and pattern of fluid dispersion. For example, the present invention makes it possible to provide maximum fluid flow through a set of nozzles directed at an area in close proximity to the showerhead, provide minimum fluid flow through a second set of distally directed nozzles, and provide intermediate volumes of fluid flow at intermediate positions using a third set of nozzles. It is also envisioned that fluid flow from combinations of more than one set of nozzles may be used concurrently. Of course, different numbers and dispersion patterns of nozzle sets may be designed into a selected showerhead.

Figure 3:
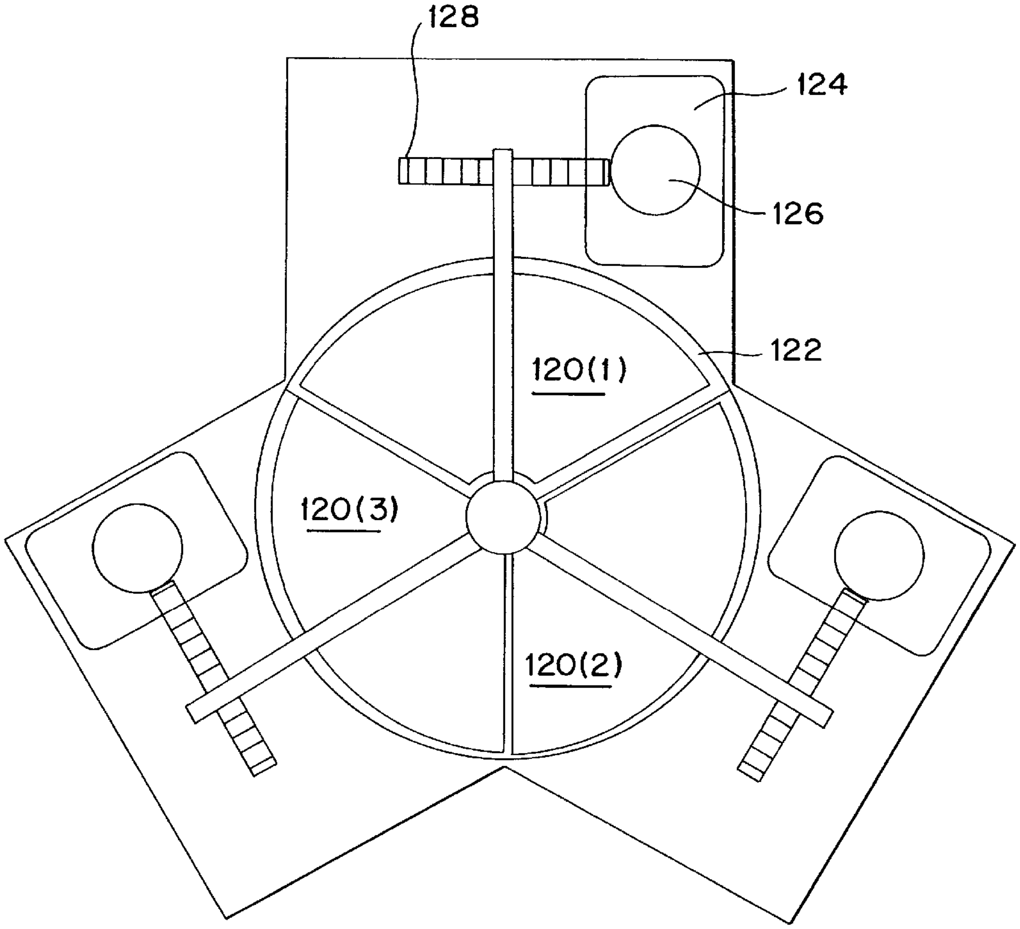
FIG. 3 illustrates a first embodiment of a valve operating system for a showerhead according to the present invention.

An operating system for regulating fluid flow is shown in FIG. 3. For the sake of example, three separated fluid flows are illustrated, however, more or less than three separated fluid flows are also envisioned. Each of three valves 120 (1–3) is pivotally driven with respect to a valve seat 122 by an actuator 124 (only one is indicated). Actuators 124 may comprise DC electric gear motors, hydromotors (i.e. deriving motive energy from the flow of fluid), or a combination of both. Output from the actuators 124 is limited to ensure valves 120 are not turned past fully open and fully closed positions. A worm 126 and worm gear 128 are illustrated in FIG. 3 for conveying rotation from actuator 124 to valve 120, however, equivalent linkages for connecting the output of an actuator 124 to a valve 120 are also envisioned. As illustrated in FIGS. 2 and 3, valve 120(1) regulates fluid flow to nozzle set 104, valve 120(2) regulates fluid flow to nozzle set 106, and valve 120(3) regulates fluid flow to nozzle set 108. Consequently, the flow of fluid emitted from a particular nozzle set is independently regulated by a corresponding valve.

Figure 4:
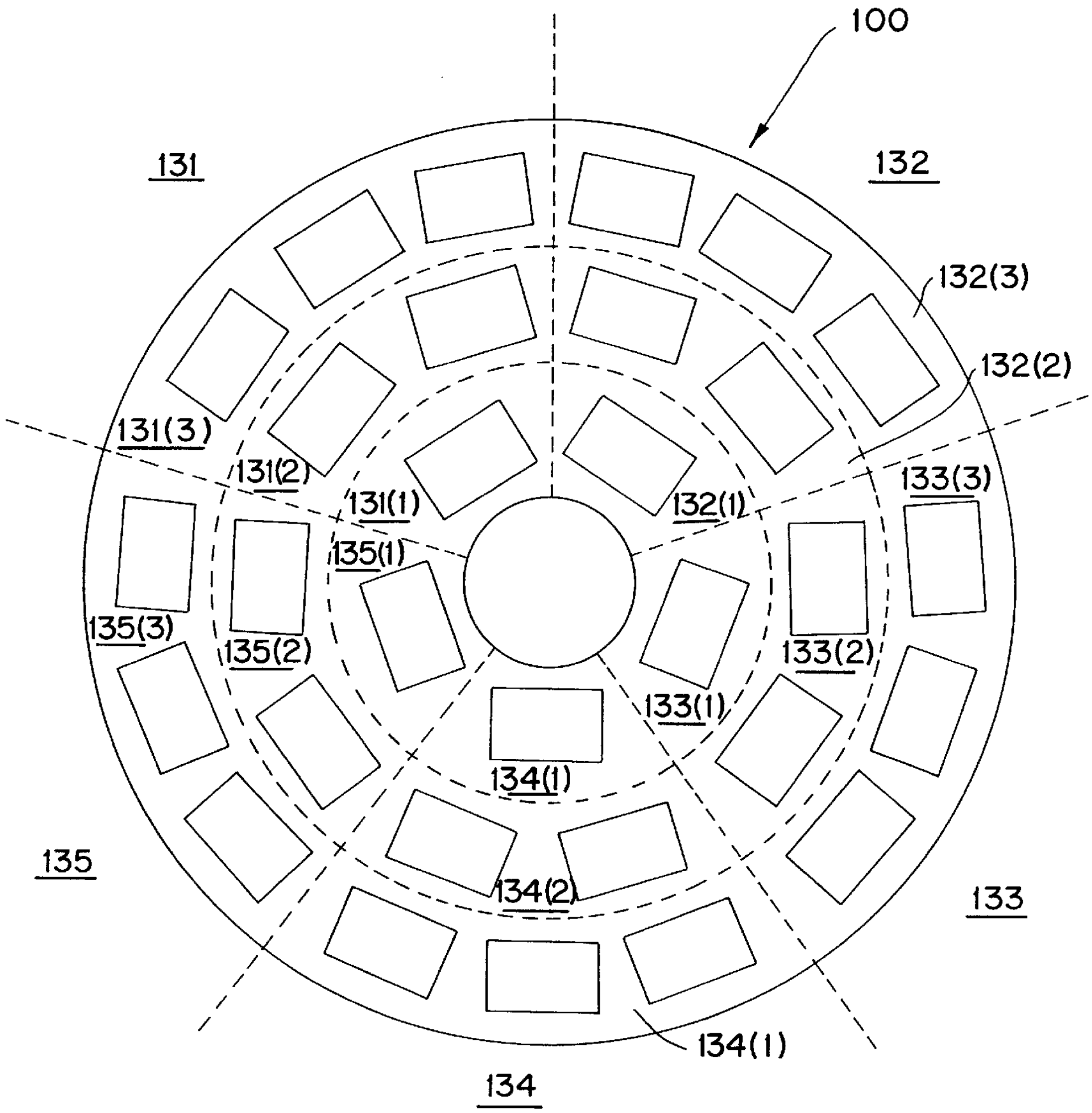
FIG. 4 illustrates an alternative arrangement of operating valves for a showerhead according to the present invention.

FIG. 4 illustrates a more sophisticated grouping of nozzles into sets. The plurality of nozzles may be divided into several wedge shaped sets (five are shown) 131–135, each of which may be subdivided into several arcuate subsets (three are shown for each set) (1)–(3). Watertight walls separate the nozzle sets 131(1)–135(3). The central area of the showerhead 100 may cover a valve operating system such as that described hereinafter with respect to FIG. 5.

Referring to FIG. 4, fluid flow to each subset 131(1)–135 (3) is regulated by a corresponding valve seat and valve arrangement. For example, to supply fluid through the nozzle(s) 120 in subset 131(1) (the radially innermost subset in set 131), the valve for subset 131(1) would be opened. To increase fluid supply using the nozzle(s) 120 in subsets 131(2) and 131(2), both valves for subsets 131(1) and 131(2) would be opened. To further increase fluid supply using all the nozzle(s) 120 in set 131, the valves for subsets 131(1) –131(3) would be opened. The control of sets 132–135 and their subsets is similar.

Operation of the valves ensures increased fluid flow as more nozzles 120 are added to the dispersion pattern. It is also envisioned that relatively larger nozzle(s) 120, rather than numerically more nozzles 120, could be used for the higher subsets (3). The valves are sized in order to maximize the fluid pressure through each subset 131(1)–135(3), thereby producing a desired dispersion from each of the nozzle subsets.

Figure 5:
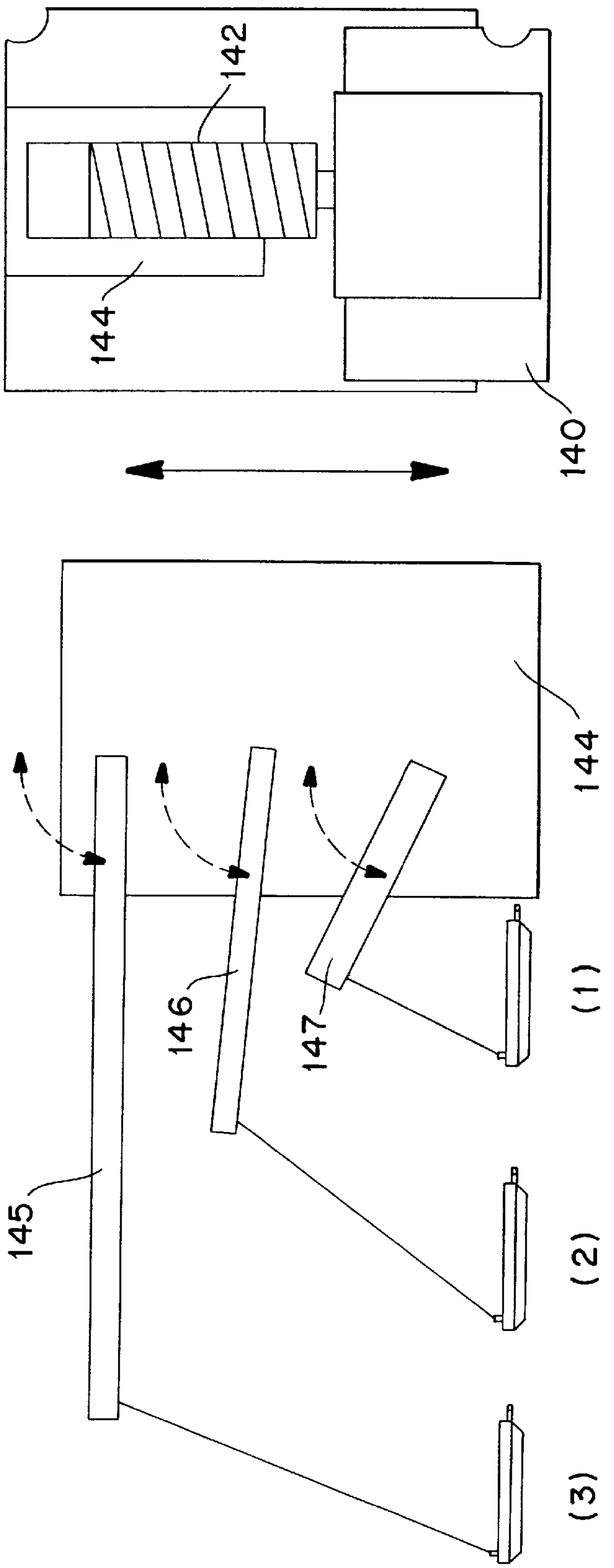
FIG. 5 illustrates a second embodiment of a valve operating system for a showerhead according to the present invention.

FIG. 5 shows a actuator mechanism for sequentially opening and closing the valves. For example, one possible sequence for opening the nozzle subset valves is: (3) then (2) then (1). The closing sequence being the reverse of the opening sequence.

Upon receiving a start opening command from a control system (described hereinafter), a motor 140 turns a screw 142. Relative rotation between screw 142 and a threaded member 144 causes linear displacement of threaded member 144 in a first direction. Pull arms 145–147 are pivotally linked with respect to threaded member 144 such that linear displacement of threaded member 144 in the first direction causes pull arms 145–147 to pivot toward a horizontal orientation. Subsequent linear displacement of threaded member 144 in the first direction causes vertical translation of pull arms 145–147 which in turn opens respective valves for nozzle subsets (1)–(3).

Insofar as pull arm 145 is initially horizontally oriented, nozzle subset valves (3) are opened upon initiating linear displacement of threaded member 144 in the first direction. Simultaneously, pull arms 146,147 begin pivoting toward a horizontal orientation which is reached first by pull arm 146 and then by pull arm 147. The sequential horizontal orientation of the pull arms 145–147 results in staggered opening of nozzle subset valves (1)–(3).

Reversing rotation of motor 140 causes linear displacement of threaded member 144 in a second direction opposite to the first direction, and a staggered closing of nozzle subset valves (1)–(3) in the reverse order of that in which they were opened.

Three pull arms 145–147 are illustrated operating three nozzle subset valves (1)–(3) for the sake of explanation only. It is to be understood that more or less pull arms may be pivotally linked with the threaded member 144, and that different numbers and combinations of nozzle subset valves may be associated with respective pull arms thereby enabling any sequence or combination of nozzle subsets to be operated.

It is also envisioned that drive mechanisms other than a screw could be used to linearly displace a body pivotally linked to one or more pull arms.

Further, alternative drive mechanisms could include individual actuation of valve arrangements by separate motors (as discussed above with regard to FIG. 3), solenoids, pneumatic or hydraulic cylinders, or any other equivalent means.

Figure 6:
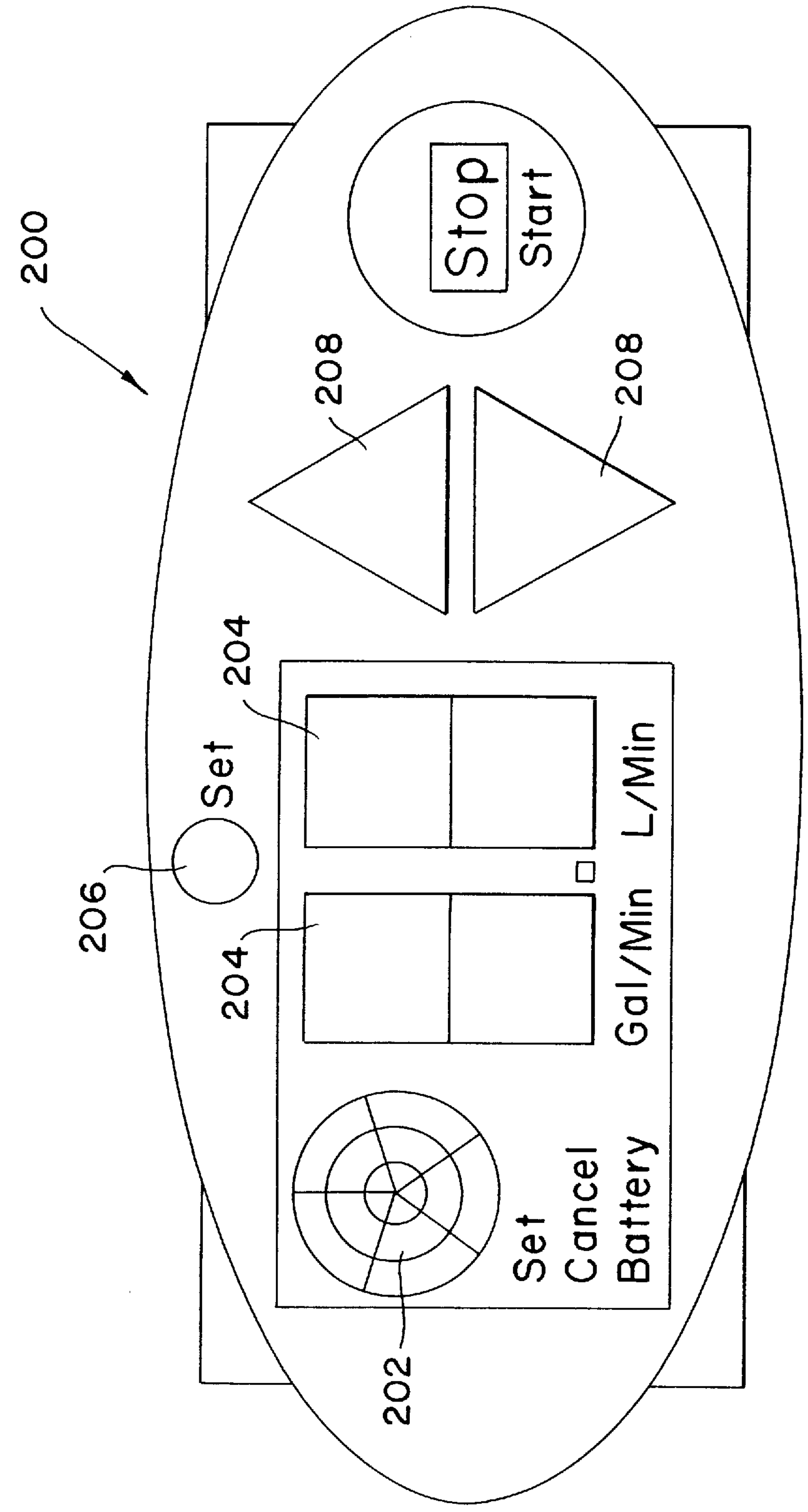
FIG. 6 illustrates a user control panel for use with a showerhead according to the present invention.

FIG. 6 illustrates a user control panel 200 for controlling the showerhead according to the present invention. Control panel 200 is used to select the desired dispersion pattern, adjust the fluid flow, and shut down the system. An indicator 202 graphically illustrates the nozzle sets which are activated. Indicator 202 may also be used to indicate the degree of fluid flow (e.g. the percentage each valve 120 is open with respect to valve seat 122). A numeric display 204 may quantify the fluid flow, i.e. the number of gallons or liters per minute flowing through the system. Additionally, indicator 202 and/or numeric display 204 may relate information about the status of the control panel 200, such as would be required in an input mode, or to warn of a low battery condition. FIG. 6 also shows a "set" button 206 to access the input mode, "manual adjustment" buttons 208 to change or override any programmed settings, and a "stop" button 210 to instantly close all nozzle set valves in the event of an emergency. The control panel 200 may be encased in a watertight container for safe operation when installed near the fluid flow. Control panel 200 may alternatively be located away from the dispersion of fluid flow such as in another room. A communication system 400 between the control panel 200 and the valve unit 20 may be via wires, a radio wave link, an infrared link, or any equivalent manner of interrelating the control panel 200 and valves 120.

Figure 7:
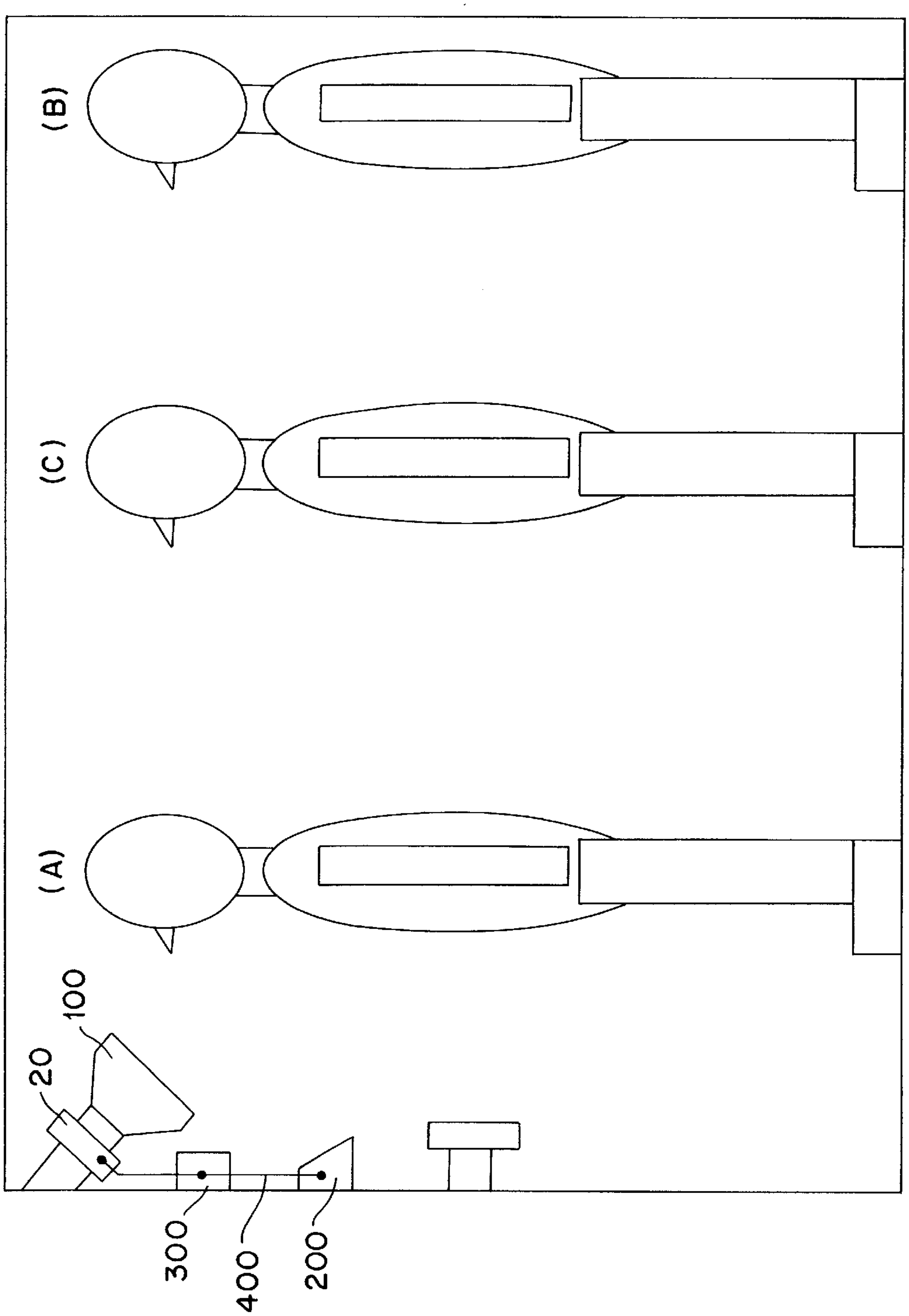
FIG. 7 illustrates an example of how the present invention may be installed.

Referring to FIG. 7, a typical installation would include replacing the convention showerhead with the showerhead 100 according to the present invention, and locating the control panel 200 at a readily accessible location. Additionally, a position detection system (PDS) 300 may be installed to determine the proximity of a body with respect to the showerhead 100. The PDS 300 may use radar, infrared, sonic or any other equivalent technology to determine whether a body is at a position (A) proximate to the showerhead 100, at a position (B) distant from the showerhead 100, or within a predetermined range (C) between positions (A) and (B).

Output from the PDS 300 may be provided to the control panel 200 using the same communication link as that between the control panel 200 and valve unit 20. Position information from the PDS 300 may be used to actuate an appropriate valve(s) 120 to control dispersement of the fluid. For example, it may be desirable to shut off all the nozzles sets if the body is at a position (B) which is too far from the showerhead (100) for the fluid to reach. Alternatively, the cooperative operation of the PDS 300, control panel 200 and valve unit 20 could be used to adjust the fluid dispersement to "follow" movements of a body.

It is envisioned that each component of the system would be self powered, either having a separate battery pack or powered by fluid flow from the fluid source.

Figure 8:
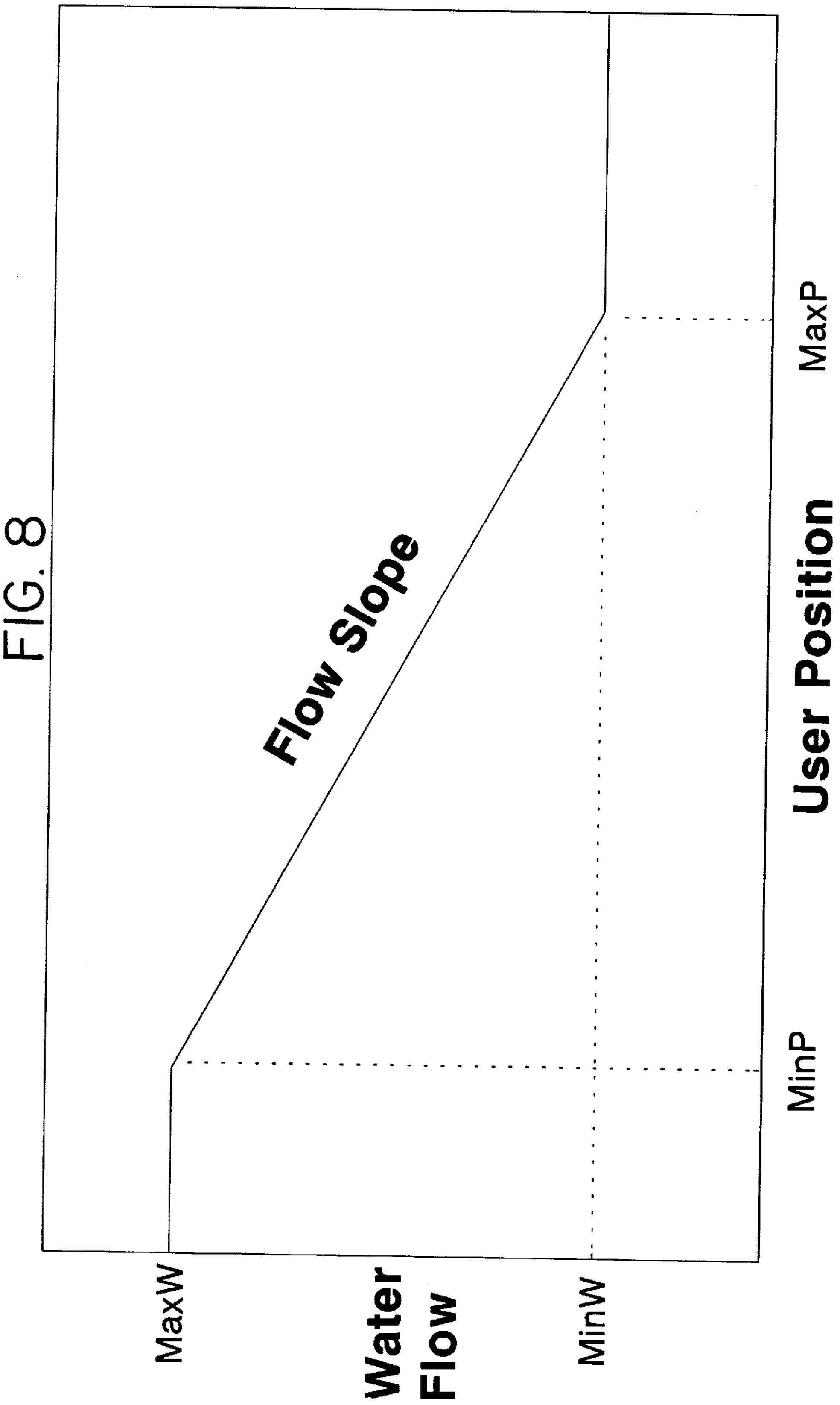
FIG. 8 illustrates an example of how the present invention may be operated.

In operation, the system would be initialized by positioning a body at the proximate position (A) with respect to the showerhead and input the maximum acceptable fluid flow corresponding to the proximate position (A). The same procedure would be repeated for distant position (B) except the minimum acceptable fluid flow would be input. Internal programming within the control panel 200 would generate a fluid flow slope as seen in FIG. 8 and determine the amount each nozzle set valve will be open for any given position of the body with respect to showerhead 100. Using the aforementioned features of the control panel 200, the fluid flow slope can be customized as desired. Further, the control panel 200 may include memory capability for storing and recalling individual profiles for one or more users.

Optionally, a sensor 50 in contact with the fluid at the fluid source may also detect changes in fluid temperature or pressure. Such information would be used by the control panel 200 to adjust the valves 120 to compensate for sudden decreases in fluid pressure, or shut down the system in the event of sudden increases in fluid temperature. Other changes and modifications within the scope of the appended claims hereinafter are also envisioned.

What is claimed is:

1. A system for dispersing a fluid from a fluid source toward a body, said system comprising:

a showerhead dispersing the fluid, said showerhead including a plurality of nozzles, said plurality of nozzles are separated into a plurality of nozzle sets each containing at least one of said plurality of nozzles;

valves infinitely variably regulating flow of the fluid to each of said plurality of nozzle sets, said valves being interposed between the fluid source and said showerhead, said valves including a separate valve for each of said plurality of nozzle sets;

a plurality of fluid conduits establishing fluid communication between said valves and said showerhead, each one of said plurality of fluid conduits establishing fluid communication between a different one of said separate valves and a corresponding nozzle set;

a position detector determining the position of the body with respect to said showerhead; and a controller individually adjusting each of said separate infinitely variable valves to automatically establish an appropriate fluid flow from each of said plurality of nozzle sets for each position of the body with respect to said showerhead as determined by said position detector.

2. The system according to claim 1, wherein a single showerhead disperses all the fluid from the fluid source.

3. The system according to claim 1, wherein said plurality of fluid conduits extend within a common sheath.

4. The system according to claim 3, wherein said common sheath includes a substantially rigid tubular covering circumscribing said plurality of fluid conduits and supporting said showerhead.

5. The system according to claim 3, wherein said plurality of fluid conduits and said common sheath are longitudinally elongated and pliable.

6. The system according to claim 1, wherein said valves include an actuator driving each said separate valve.

7. The system according to claim 6, wherein a separate actuator drives each said separate valve.

8. The system according to claim 6, wherein said actuator is an electric motor.

9. The system according to claim 8, wherein said electric motor is powered by a direct current source.

10. The system according to claim 6, wherein said actuator is powered by the fluid flowing from the fluid source.

11. The system according to claim 1, further comprising:

a communication link extending between said controller and said valves, wherein said controller is separated and spaced from said valves.

12. The system according to claim 11, wherein said communication link includes a plurality of wires.

13. The system according to claim 11, wherein said communication link includes a transmitter and a receiver.

14. The system according to claim 13, wherein said transmitter and said receiver are operably interconnected by radio waves.

15. The system according to claim 13, wherein said transmitter and said receiver are operably interconnected by infrared light.

16. The system according to claim 1, wherein said position detector includes a radar transceiver.

17. The system according to claim 1, wherein said position detector includes a sonar transceiver.

18. The system according to claim 1, further comprising:

a fluid supply sensor in contact with said fluid, said sensor detects and informs said controller of changes in at least one of the fluid properties consisting of fluid pressure and fluid temperature.

19. The system according to claim 1, wherein said controller includes a memory storing and recalling at least one system profile.

* * * * *